US005881611A

United States Patent [19]

Wagner et al.

[11] Patent Number: 5,881,611

[45] Date of Patent: Mar. 16, 1999

[54] PUNCH BUTTON AND PROCESS

[75] Inventors: David Wagner, Hartford; Donald Gruber, West Bend, both of Wis.

[73] Assignee: Serigraph, Inc., West Bend, Wis.

[21] Appl. No.: 779,796

[22] Filed: Jan. 7, 1997

[51] Int. Cl.$^{6}$ .................................................... B29D 19/00

[52] U.S. Cl. .......................... 79/1; 83/19; 83/55; 83/862; 264/153; 264/163

[58] Field of Search .................................... 83/19, 50, 52, 83/55, 695, 862; 264/153, 156, 157, 160, 163; 493/363, 364, 372; 79/1

[56] References Cited

U.S. PATENT DOCUMENTS

| | | | |
|---|---|---|---|
| 2,552,353 | 5/1951 | Troth et al. | 83/862 X |
| 3,020,809 | 2/1962 | Guyer et al. | 493/372 X |
| 3,788,118 | 1/1974 | Joseph | 83/695 X |
| 3,997,052 | 12/1976 | Eddy et al. | 264/153 X |
| 4,104,349 | 8/1978 | Hillgenberg | 264/153 |
| 4,281,546 | 8/1981 | Fraleigh | 83/19 X |
| 4,477,537 | 10/1984 | Blase et al. | 83/55 X |
| 4,818,461 | 4/1989 | Batson et al. | 264/156 X |
| 5,019,314 | 5/1991 | Burlando | 83/50 X |
| 5,247,862 | 9/1993 | Haack | 83/55 X |

FOREIGN PATENT DOCUMENTS

| | | | |
|---|---|---|---|
| 2037141 | 2/1987 | Japan | 264/163 |

*Primary Examiner*—Eugenia A. Jones

*Attorney, Agent, or Firm*—Andrus, Sceales, Starke & Sawall

[57] ABSTRACT

A punch button (32) has a central disc (36) integral with and separable from an outer peripheral annular ring (38). The disc and ring are joined by a breakaway portion (40) of reduced thickness. A pair of peel points or pilot cuts (50 and 52) may be provided on distally opposite sides of the disc, and if so, the disc is initially separable from the ring at the peel points and then rotatable about a rotation axis perpendicular to an axis through the distally opposite pilot cuts. The punch button is formed by providing a strip of material of a first thickness, placing the strip in a die, performing an inner cut with the die and partially cutting through the strip to yield first and second subpieces joined to each other by material of a second reduced thickness, and performing an outer cut with the die and cutting all the way through the strip to yield a piece composed of the first and second subpieces providing the disc and ring. The pilot cuts are performed by the die during performance of the inner cut and to a deeper depth than the inner cut. All of the cuts are performed in a singular die step operation wherein an outer punch (58) is moved toward an inner punch (66) in one axial direction to perform the inner cut, the pilot cuts, and a portion of the outer cut, and continuing movement of the outer punch in the one direction and simultaneously moving the inner punch in the same direction in unison with the outer punch to complete the outer cut.

23 Claims, 9 Drawing Sheets

FIG. 1
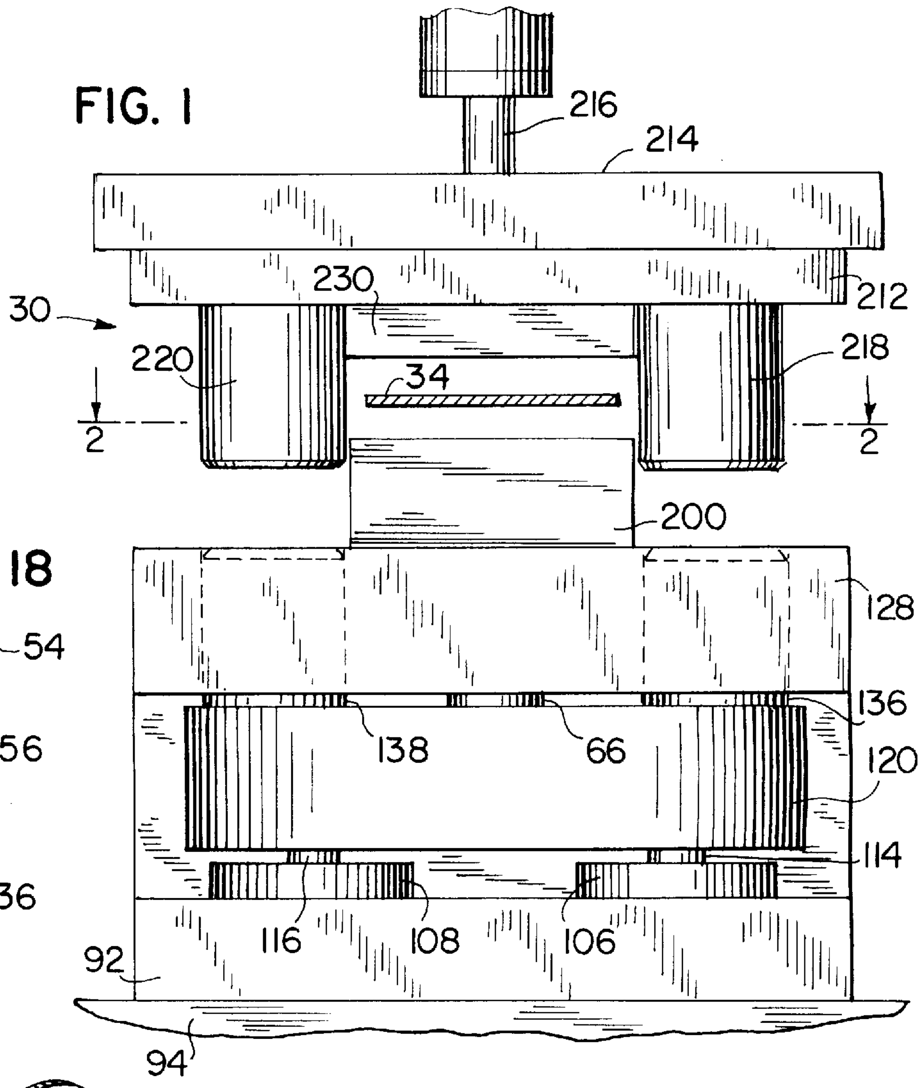
FIG. 18
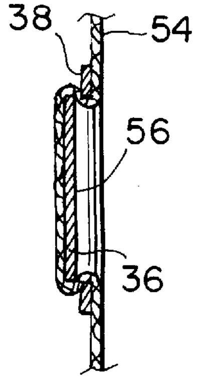
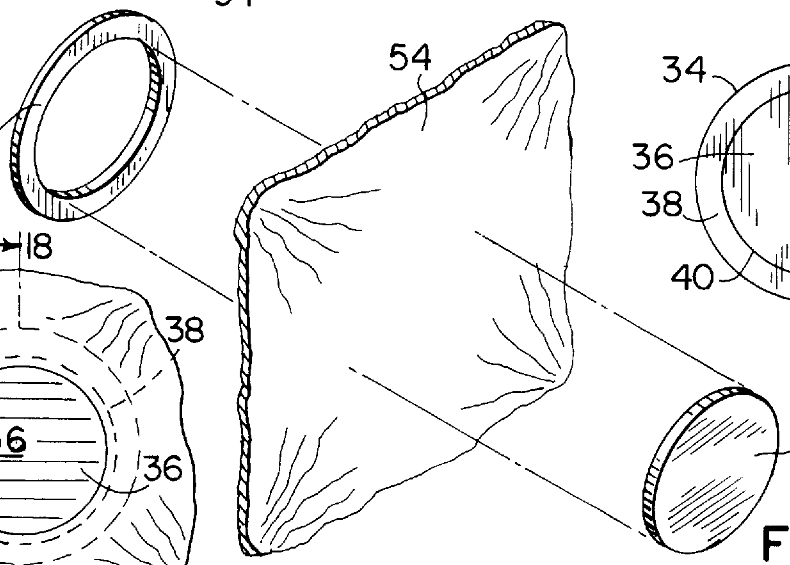
FIG. 16
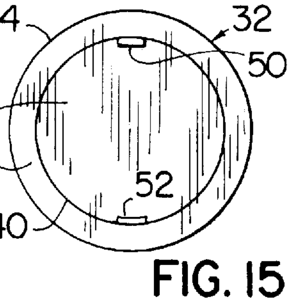
FIG. 15
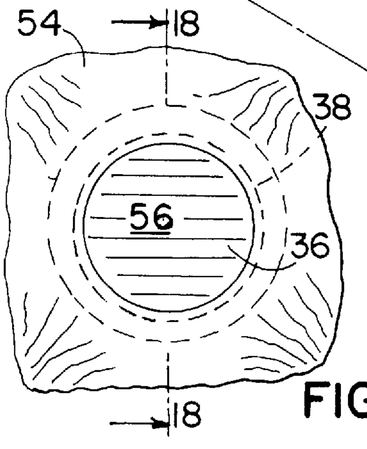
FIG. 17

FIG. 4A
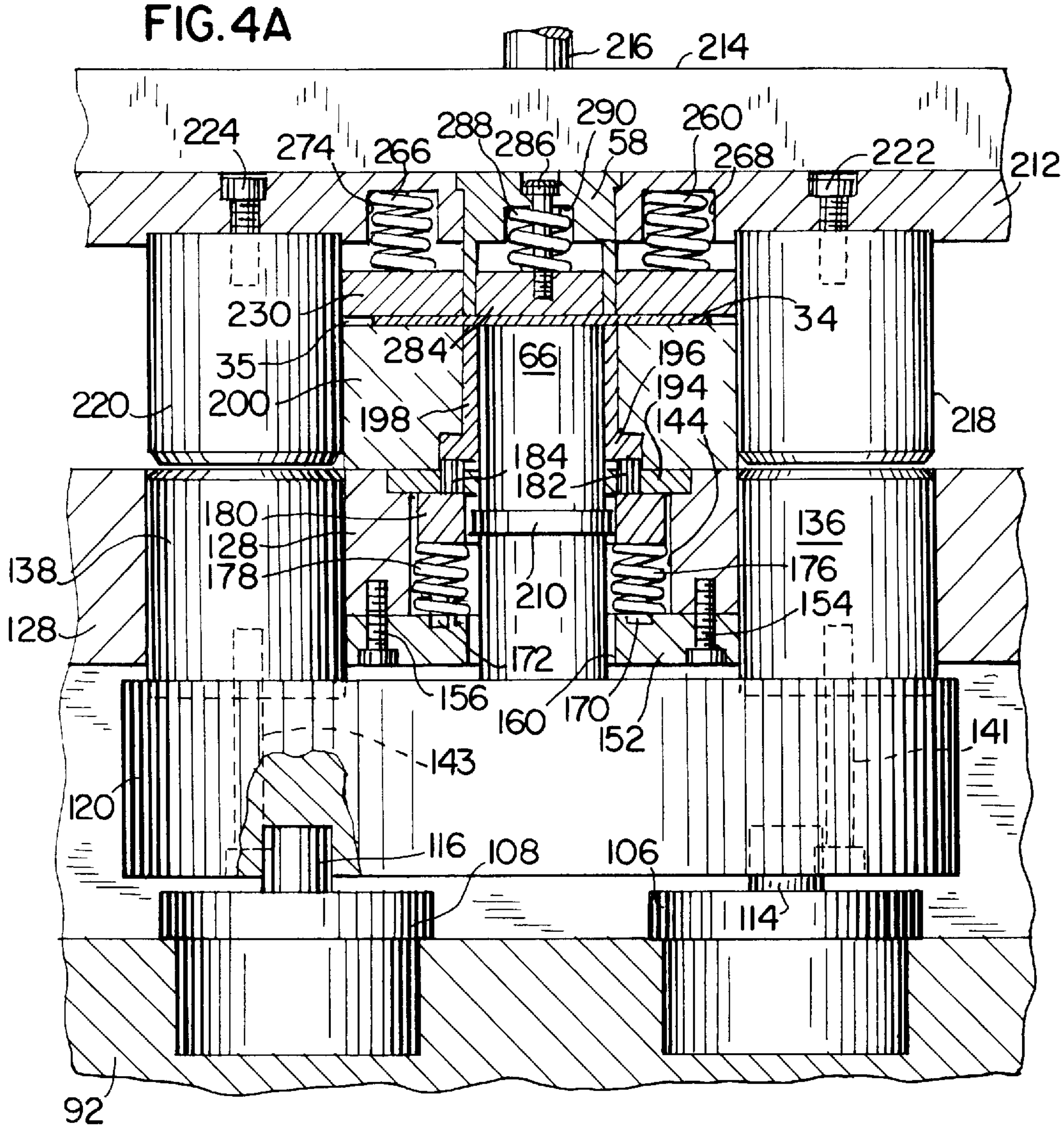
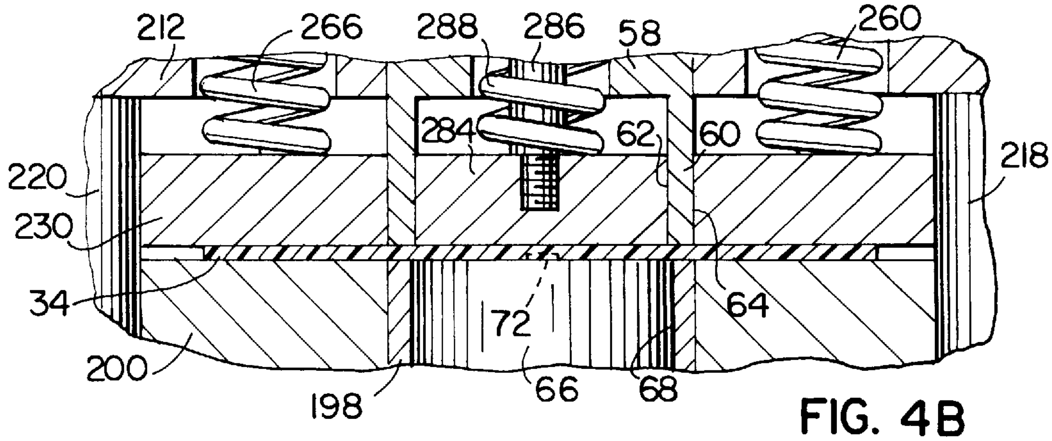
FIG. 4B

FIG. 5A
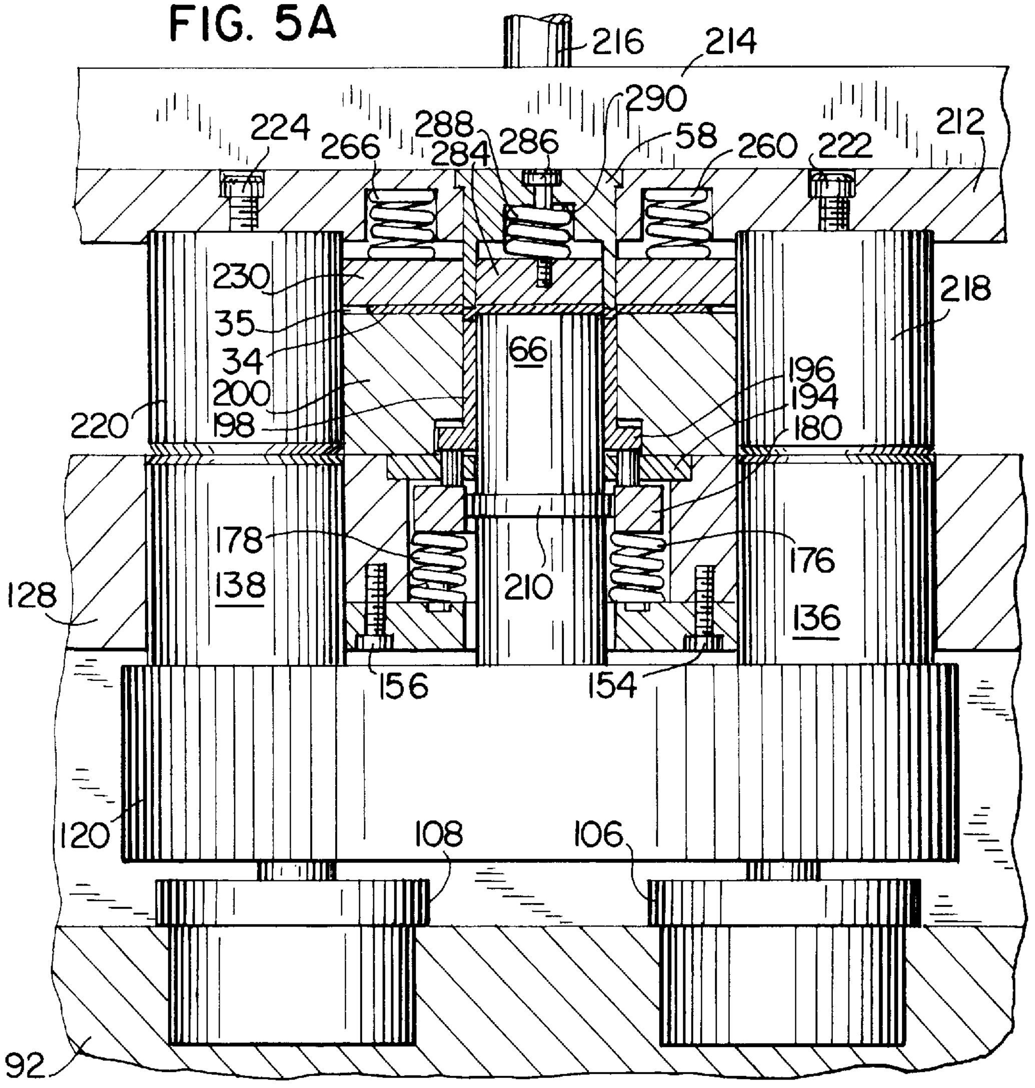
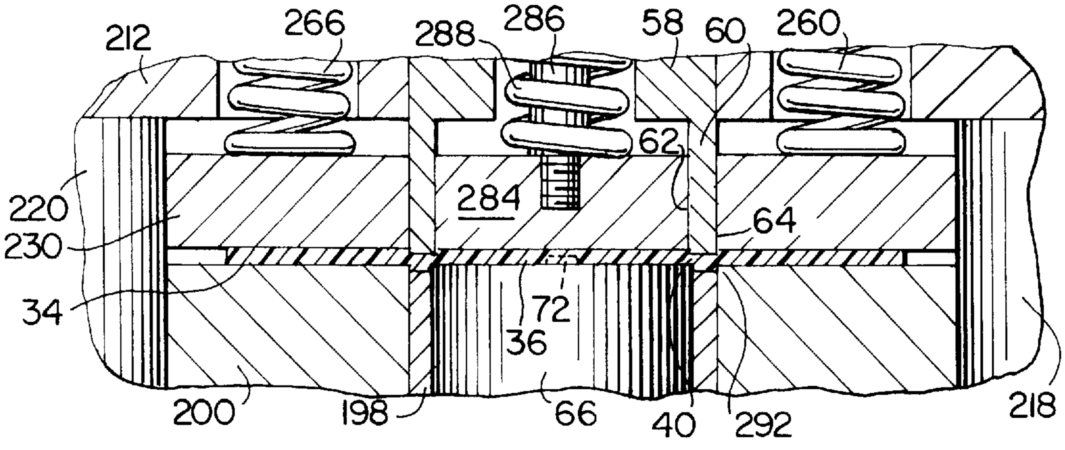
FIG. 5B

FIG. 6A
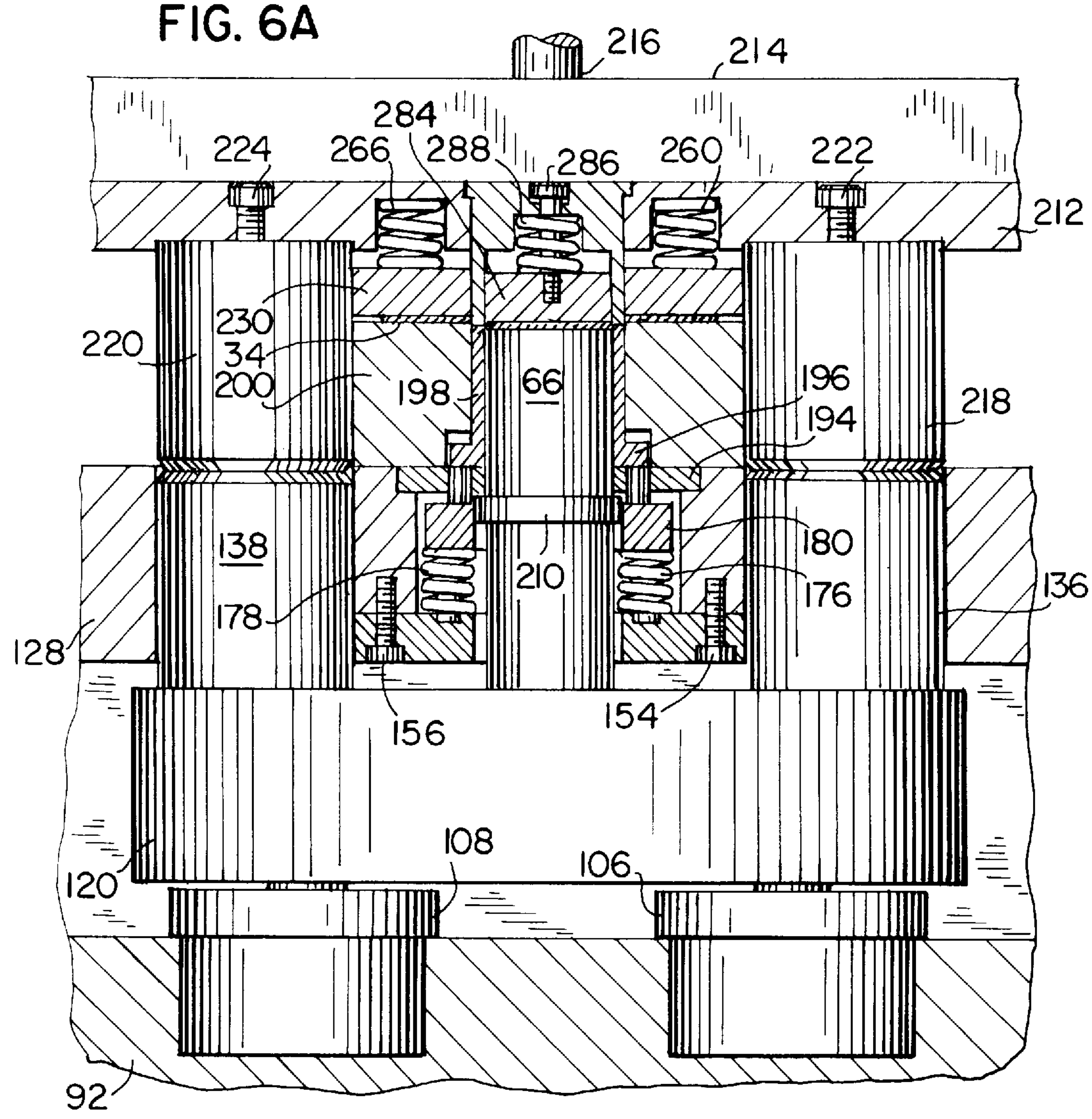
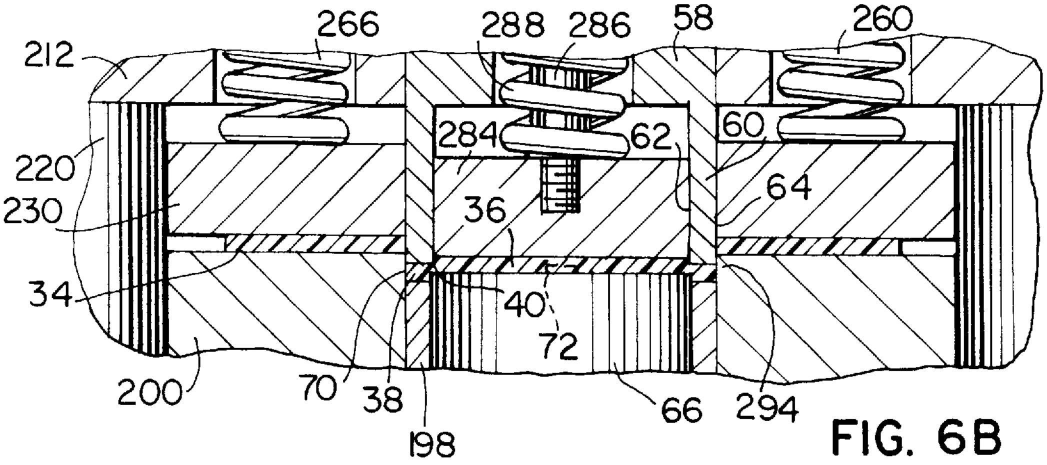
FIG. 6B

PUNCH BUTTON AND PROCESS

BACKGROUND AND SUMMARY

The invention relates to punch buttons and methods for forming same.

In the present invention a punch button is formed by performing an inner cut on a strip of material with a die partially cutting through the strip to yield inner and outer subpieces joined to each other by a thickness less than the starting thickness of the strip, and performing an outer cut all the way through the strip to yield a piece composed of the inner and outer subpieces. In preferred form, the method provides a punch button having a central disc integral with and separable from an outer ring laterally joined by a breakaway portion of the noted reduced thickness. A second inner deeper pilot or peel point cut may be provided along circumferential portions of the boundary of the disc and ring, facilitating later separation.

BRIEF DESCRIPTION OF THE DRAWINGS

FIG. 1 is a side elevation view of a die for forming a punch button in accordance with the invention.

FIG. 4A is a sectional view taken along line 4A—4A of FIG. 2.

FIG. 4B is an enlargement of a portion of FIG. 4A.

FIG. 5A is a view like FIG. 4A and shows further sequential operation.

FIG. 5B is an enlargement of a portion of FIG. 5A.

FIG. 6A is a view like FIG. 5A and shows further sequential operation.

FIG. 6B is an enlargement of a portion of FIG. 6A.

FIG. 15 is a bottom view of the formed punch button.

FIG. 16 is an exploded perspective view illustrating an application of the punch button of FIG. 15.

FIG. 17 is an elevation view of the assembled structure of FIG. 16.

FIG. 18 is a sectional view taken along line 18—18 of FIG. 17.

DETAILED DESCRIPTION

Figure 13:
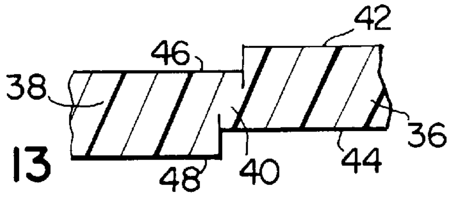
FIG. 13 is an enlargement of a portion of FIG. 9.
Figure 12:
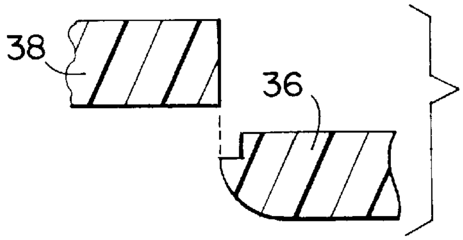
FIG. 12 is like FIG. 11 and shows breakaway of the subpieces.
Figure 14:
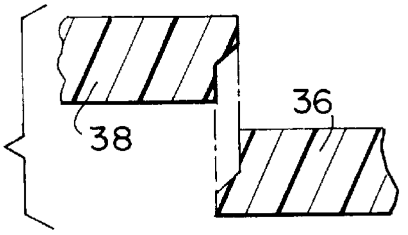
FIG. 14 is like FIG. 13 and shows breakaway of the subpieces.

FIG. 1 shows a die 30 for forming a punch button 32, FIG. 15, from a strip of material 34, for example a thin, e.g. 0.035 inch thick, sheet of material such as cardboard, plastic, or other material. The formed punch button includes a central circular disc 36 integral with and separable from an outer peripheral annular ring 38. The disc lies in a plane perpendicular to an axially extending axis. The disc and the ring are laterally joined by a breakaway portion 40, FIGS. 15, 6B, 9 and 13, of reduced axial thickness. Disc 36, FIG. 13, has a top laterally extending surface 42 spaced from a bottom laterally extending surface 44 by the axial thickness of the disc, which is the thickness of the starting strip of material 34, e.g. 0.035 inch. Ring 38 has a top laterally extending surface 46 spaced from a bottom laterally extending surface 48 by the axial thickness of the ring, which is the thickness of the starting strip of material 34, e.g. 0.035 inch. Disc 36 is axially offset from ring 38 such that the plane defined by top surface 42 of disc 36 is axially spaced from the plane defined by the bottom surface 48 of ring 38 by a distance greater than the axial thickness of disc 36. The plane defined by the bottom surface 44 of disc 36 is axially spaced from the plane defined by the top surface 46 of ring 38 by a distance equal to the axial dimension of the reduced thickness portion 40 joining disc 36 and ring 38. The axial dimension of reduced thickness portion 40 is significant because it must be thick enough to retain disc 36 and ring 38 in assembled integral condition until separated by the end user, but yet thin enough to facilitate easy separation by the user without bending or crimping of the disc 36 and/or ring 38 or other destructive alteration. In combination with the noted 0.035 inch thick starting dimension, it is preferred that the axial dimension of reduced thickness portion 40 be about 0.018 inch. The lateral dimension of portion 40, i.e. left to right in FIG. 13 between surfaces 62 and 68, is preferably about 0.015 inch. The combination of the noted dimensions enables retention of the disc and ring in assembled condition prior to separation, yet facilitates easy breakaway when desired by the end user, FIG. 14.

Figure 2:
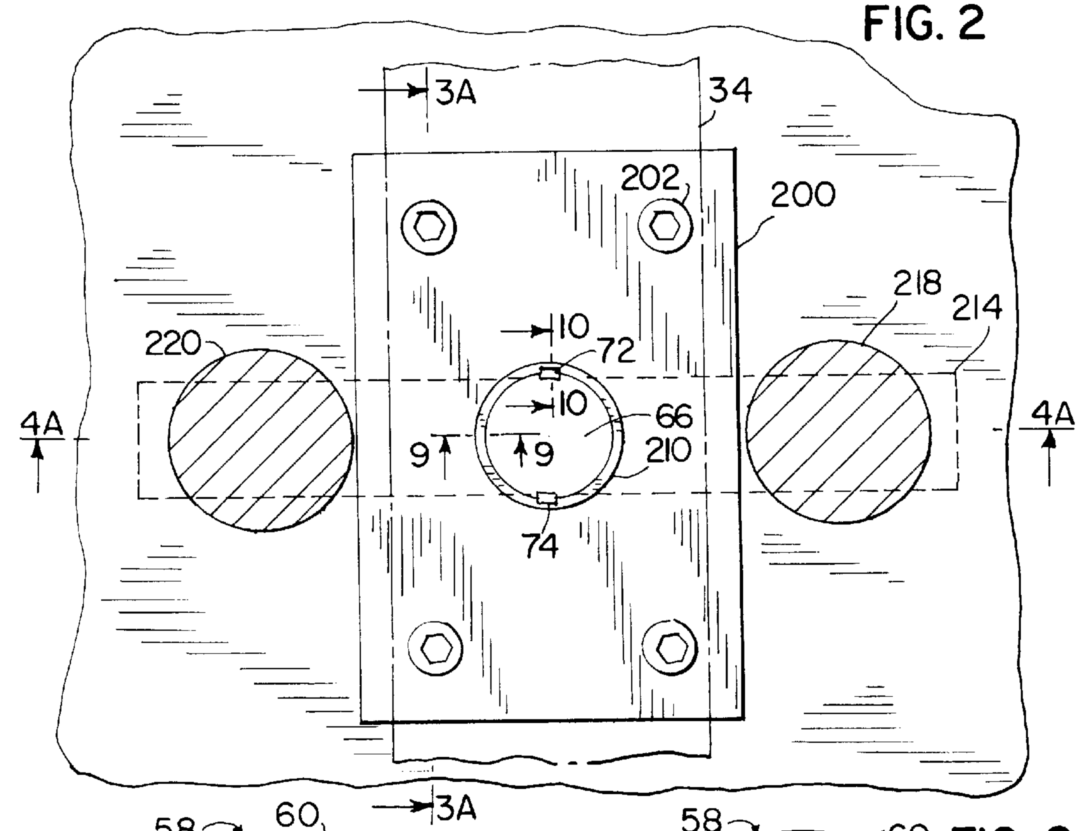
FIG. 2 is a sectional view taken along line 2—2 of FIG. 1.
Figure 10:
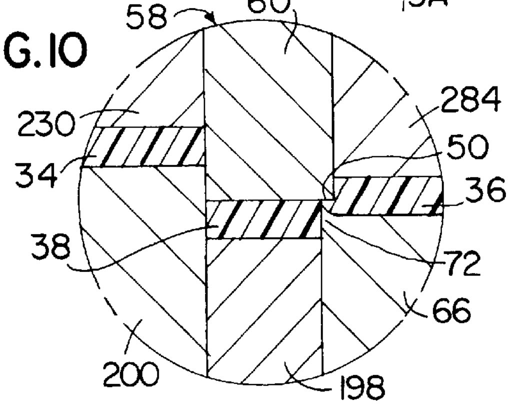
FIG. 10 is a sectional view taken along line 10—10 of FIG. 2.
Figure 11:
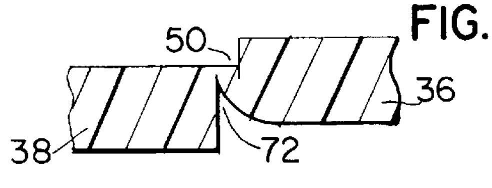
FIG. 11 is an enlargement of a portion of FIG. 10.

The bottom surface 44 of disc 36 has a pair of indention sections 50 and 52 therein along the outer periphery 40 thereof formed by pilot cuts, to be described, providing peel points and defining indented sections extending toward top surface 42 of the disc, FIGS. 10 and 11, to provide the indention sections of further reduced axial thickness joining disc 36 and ring 38. The further reduced axial thickness of each of indention sections 50 and 52 is less than the reduced axial thickness at 40, FIG. 13, and in preferred form the axial thickness of each of sections 50 and 52 is zero, i.e. the material strip 34 is pierced all the way through at such sections. Indention sections 50 and 52 laterally distally oppositely face each other across disc 36. The disc is initially separable from ring 38 at the peel points provided by distally opposite indention sections 50 and 52, and then rotatable about a rotation axis perpendicular to an axis through distally opposite indention sections 50 and 52. This facilitates easy separation of disc 36 from ring 38. In other embodiments, indention sections 50 and 52 are eliminated.

One of the applications of the separated disc and ring is illustrated in FIGS. 16–18. Disc 36 and ring 38 are placed on opposite sides of a sheet of material 54, such as the pocket of a shirt, a lapel, or the like. The disc and ring are then pressed toward each other such that the disc nests within the ring, with the material or cloth 54 wedged therebetween along the peripheral boarder. Alternatively, the disc is pushed through the ring, FIG. 18, to further wedge the cloth material therebetween. The disc typically has graphics on at least one side thereof as at 56, for displaying a symbol, slogan, artwork, etc., on the pocket, lapel or the like. The noted wedging action retains the disc and ring on material 54.

Figure 9:
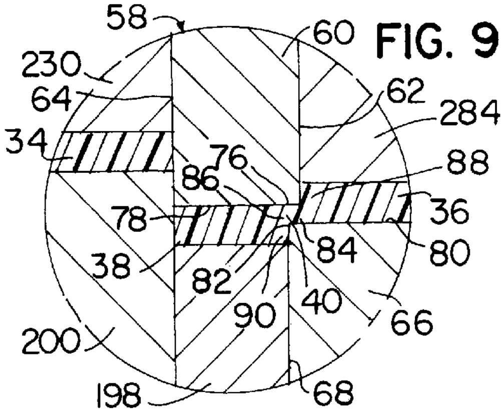
FIG. 9 is a sectional view taken along line 9—9 of FIG. 2.

To form punch button 32, material strip 34 is placed in die 30, FIGS. 1–4. An inner cut is performed with the die partially cutting through strip 34 to yield first and second subpieces 36 and 38, FIGS. 5A and 5B, joined to each other by the material at reduced axial thickness section 40, FIGS. 9 and 13. An outer cut is performed with the die cutting all the way through strip 34, FIGS. 6A and 6B, to yield a piece 32 composed of first and second subpieces 36 and 38. The die has a top outer punch 58, FIGS. 4A and 4B having a sidewall 60 of given lateral width between inner and outer dimensions 62 and 64, respectively. The die has a lower inner punch 66 having an outer dimension 68 less than the outer dimension 64 of outer punch 58 and greater than the inner dimension 62 of outer punch 58. The noted inner cut providing reduced axial thickness section 40 is performed at the outer dimension 68 of inner punch 66 and the inner dimension 62 of outer punch 58. The noted outer cut separating piece 32 from strip 34 is performed at the outer dimension 64 of outer punch 60 as illustrated in FIGS. 6B and 9.

Punches 58 and 66 are disposed in opposing aligned relation along an axial direction, up and down in FIGS. 1–6, and facing each other across an axial gap 35 therebetween. Strip 34 is a planar sheetlike member and is placed between the punches in the axial gap such that the plane of the strip extends laterally of the noted axial direction, i.e. the plane of strip 34 in FIG. 4A extends into and out of the page. Upper punch 58 is moved axially downwardly toward lower punch 66, FIGS. 5A and 5B, to perform the noted inner cut and to partially perform the noted outer cut, whereafter both punches move axially downwardly, FIGS. 6A and 6B, to complete the outer cut. The noted 0.015 inch lateral offset between outer surface 68, FIG. 9 of lower inner punch 66 and inner surface 62 of sidewall 60 of upper outer punch 58 in combination with a threshold force sensor resisting movement of lower punch 66 until a given threshold force is applied, enables the noted inner and outer cuts to be performed in a singular die motion and operational step providing both a partial inner cut at 40 and a complete through-cut at 70. The noted singular die step operation is performed by moving upper punch 58 axially downwardly toward lower punch 66 to perform the noted inner cut and a portion of the noted outer cut, and continuing movement of upper punch 58 axially downwardly and simultaneously moving lower punch 66 axially downwardly in unison with punch 58 to complete the noted outer cut.

During performance of the noted inner cut providing reduced axial thickness section 40, there may simultaneously be performed a pair of pilot cuts to a deeper depth providing indention sections 50 and 52, FIGS. 15, 2, 10 and 11. The pilot cuts are performed along distally opposite portions of the noted inner cut along boarder 40, FIG. 15. Subpieces 36 and 38 are separated from each other initially at peel points provided by pilot cuts 50 and 52 and then along the remainder of inner cut 40, as above described. Distally opposite outer peripheral fingers 72 and 74 on the lower inner punch 66, FIGS. 2, 5B and 8A, perform the noted pilot cuts, to be described.

Formed piece 32, FIG. 15, has the noted central disc 36 integral with and separable from outer ring 38. Lower inner punch 66, FIG. 9, defines at 68 the inner periphery of ring 38. Upper outer punch 58 defines at 64 the outer periphery of ring 38. Upper outer punch 58 defines at 62 the outer periphery of disc 36. Outer surface 68 of inner punch 66 is axially aligned with a point 76, FIG. 9, laterally between outer and inner surfaces 64 and 62, respectively, of sidewall 60 of outer punch 58.

Outer punch 58 has an end wall 78, FIG. 9, extending laterally between inner and outer surfaces 62 and 64 and facing axially across gap 35. Inner punch 66 has a laterally extending end wall 80 facing axially across gap 35 and having an outer peripheral end wall portion 82 axially aligned with a portion of end wall 78 of outer punch 58 at point 76. When upper outer punch 58 moves axially downwardly, strip 34 is engaged and compressed between aligned axial end wall portions 76 and 82 of outer and inner punches 58 and 66. The material of strip 34 is pushed laterally inwardly, rightwardly in FIG. 9, to disc 36, and is also pushed laterally outwardly, leftwardly in FIG. 9, to ring 38. This yields remaining material in strip 34 of reduced axial thickness at 40 axially aligned between aligned end wall portions 76 and 82 of outer and inner punches 58 and 66 and laterally between disc 36 and ring 38. Following the noted inner and outer cuts, disc 36 has a lower portion 84, FIG. 9 laterally aligned with an upper portion 86 of ring 38, and disc 36 has an upper portion 88 axially offset from a lower portion 90 of ring 38. Outer peripheral fingers 72 and 74 on lower inner punch 66 extend axially away from end wall 80. As noted above, fingers 72 and 74 perform pilot cuts during performance of the noted inner cut and to a deeper depth than the inner cut, as illustrated in FIG. 11 showing the deeper pilot cut to axial thickness at 50, preferably zero, as compared to the axial thickness at 40 in FIG. 13. Fingers 72 and 74 are axially aligned with the inner periphery of the ring at 68, and are laterally spaced outwardly of the outer periphery of the disc at 62.

Figure 8A:
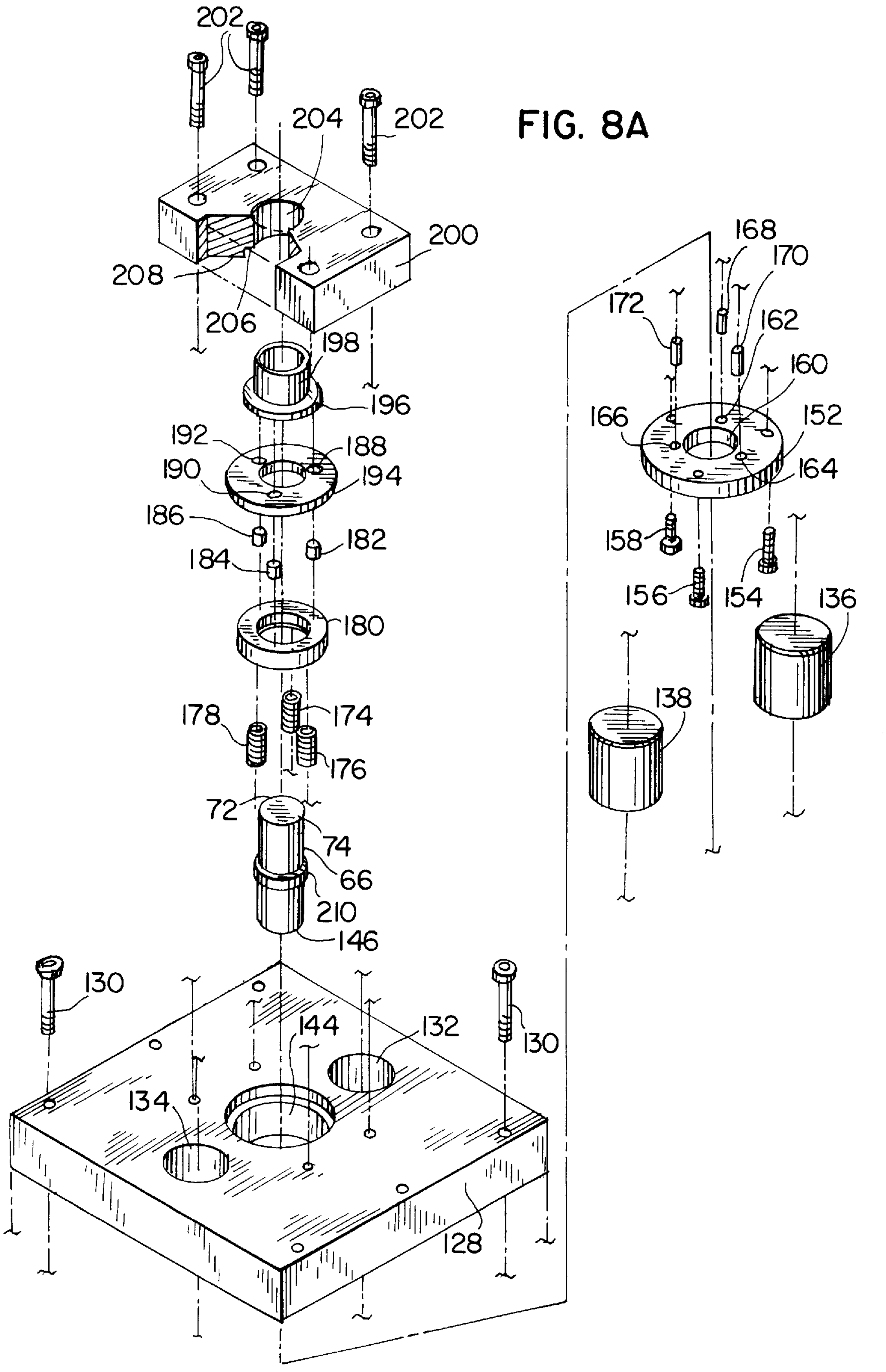
FIG. 8A is an exploded perspective view of another portion of the structure of FIG. 1.
Figure 8B:
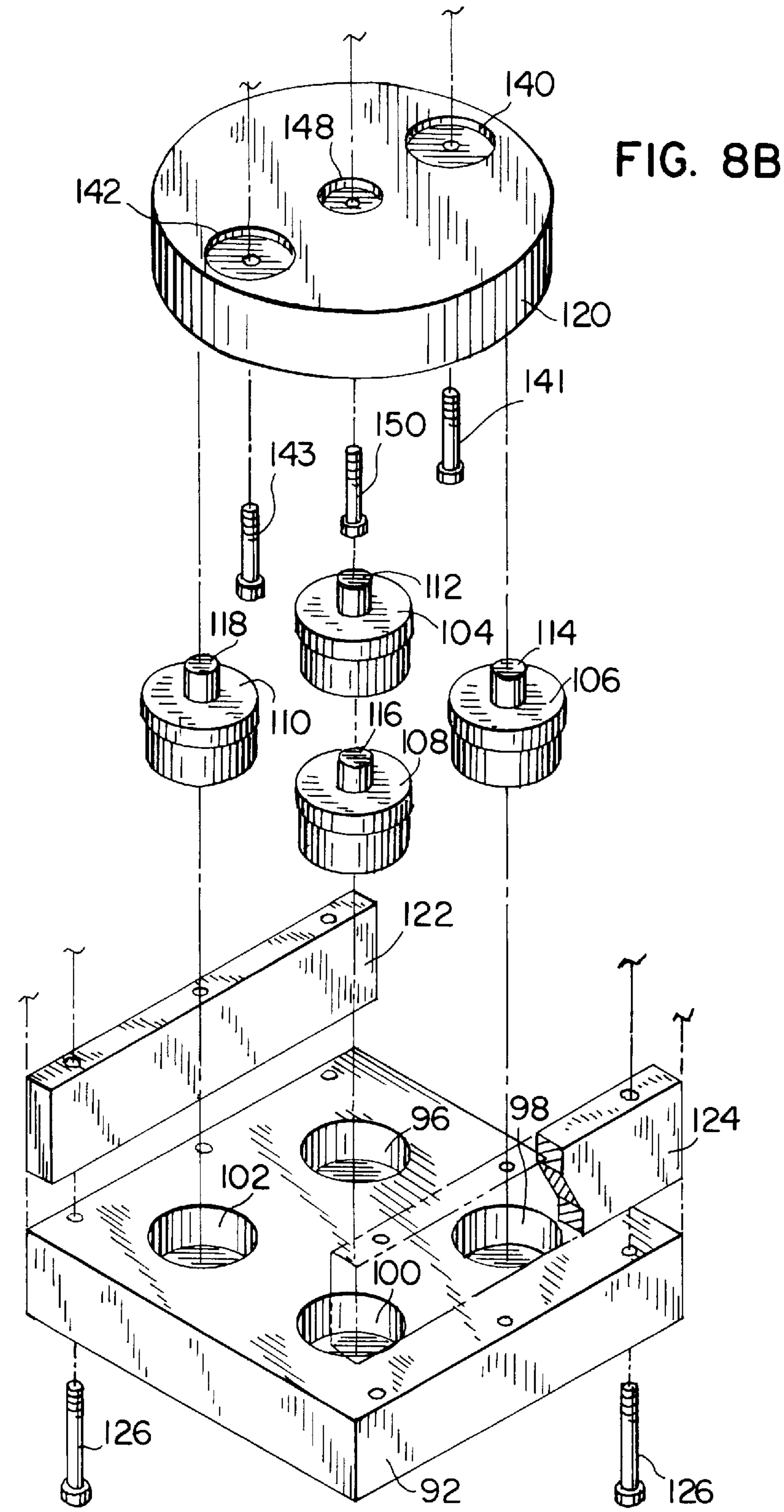
FIG. 8B is an exploded perspective view of another portion of the structure of FIG. 1.

Die 30 includes a base 92, FIGS. 1 and 8B resting on a supporting surface 94 such as the floor or a table. Base 92 has a plurality of pockets 96, 98, 100, 102 each receiving a respective threshold force sensor 104, 106, 108, 110, preferably a standard commercially available nitrogen-filled canister having a respective plunger 112, 114, 116, 118 firmly resisting movement up to a given threshold force, and then permitting controlled movement retracting the plunger, i.e. moving the plunger downwardly in FIG. 8B, when the force applied thereagainst exceeds the noted threshold. In one embodiment forming a single piece 32 during a single die step, the threshold force is selected to be 2 tons. In another embodiment forming six pieces 32 during a single die stroke, the threshold force is selected to be 25 tons. A circular platform 120 rests on plungers 112, 114, 116, 118 of force sensors 104, 106, 108, 110.

Base 92 has a pair of side rails 122 and 124 rigidly mounted thereto by bolts such as 126. An upper support base 128, FIG. 8A, is rigidly mounted on side rails 122 and 124 by mounting bolts such as 130, FIGS. 8*a*, 8B and 3A. Upper support base 128 is stationary and has a pair of openings 132 and 134 loosely receiving respective rigid cylinders 136 and 138. The cylinders rest on top of platform 120, FIG. 8B, in respective shallow pockets 140 and 142. Cylinders 136 and 138 are rigidly mounted to plate 120 in pockets 140 and 142 by respective bolts 141 and 143, FIGS. 8B and 4A. Cylinders 136 and 138 can move up and down within openings 132 and 134 of stationary base 128, as permitted by movement of platform 120.

Base 128 has a central opening 144, FIG. 8A, receiving lower inner punch 66 therein. Punch 66 has a lower surface 146 resting on plate 120, FIG. 8B, in shallow pocket 148, and rigidly mounted to plate 120 by bolt 150, FIGS. 8B and 3A. Lower inner punch 66 can move axially downwardly within opening 144 of support base 128, as permitted by force sensors 104, 106, 108, 110. The underside of base 128 has an annular plate 152, FIG. 8A, rigidly mounted thereto by bolts 154, 156, 158. Plate 152 has a central opening 160 through which punch 66 extends. Plate 152 has a plurality of upper pockets 162, 164, 166 receiving and supporting respective guide pins 168, 170, 172 which extend axially upwardly from plate 152 and guide respective helical springs 174, 176, 178 bearing axially between plate 152 and annular ring 180. Another set of pins 182, 184, 186 extend axially upwardly from ring 180 freely through respective openings 188, 190, 192 in annular plate 194. Pins 182, 184, 186 bear axially between ring 180 and lower annular flange 196 of cylindrical sleeve 198. Punch 66 extends axially upwardly through ring 180, plate 194, and sleeve 198.

An upper cap plate 200 is rigidly mounted to base 128 by bolts such as 202. Cap plate 200 has a central opening 204 receiving sleeve 198. Opening 204 has a lower downwardly facing shoulder 206 bearing against the top side of flange 196. Cap 200 has a lower surface 208 engaging the top surface of annular plate 194, to hold the illustrated assembly of pins 182, 184, 186, plate 194, ring 180, springs 174, 176, 178, pins 168, 170, 172 in place when cap plate 200 is bolted to the top of base 128, and plate 152 is bolted to the underside of base 128. Annular shoulder 210 around punch 66 is provided to limit upward travel of punch 66, by engagement of shoulder 210 with the underside of ring 180, to keep punch 66 within the assembly.

Figure 7:
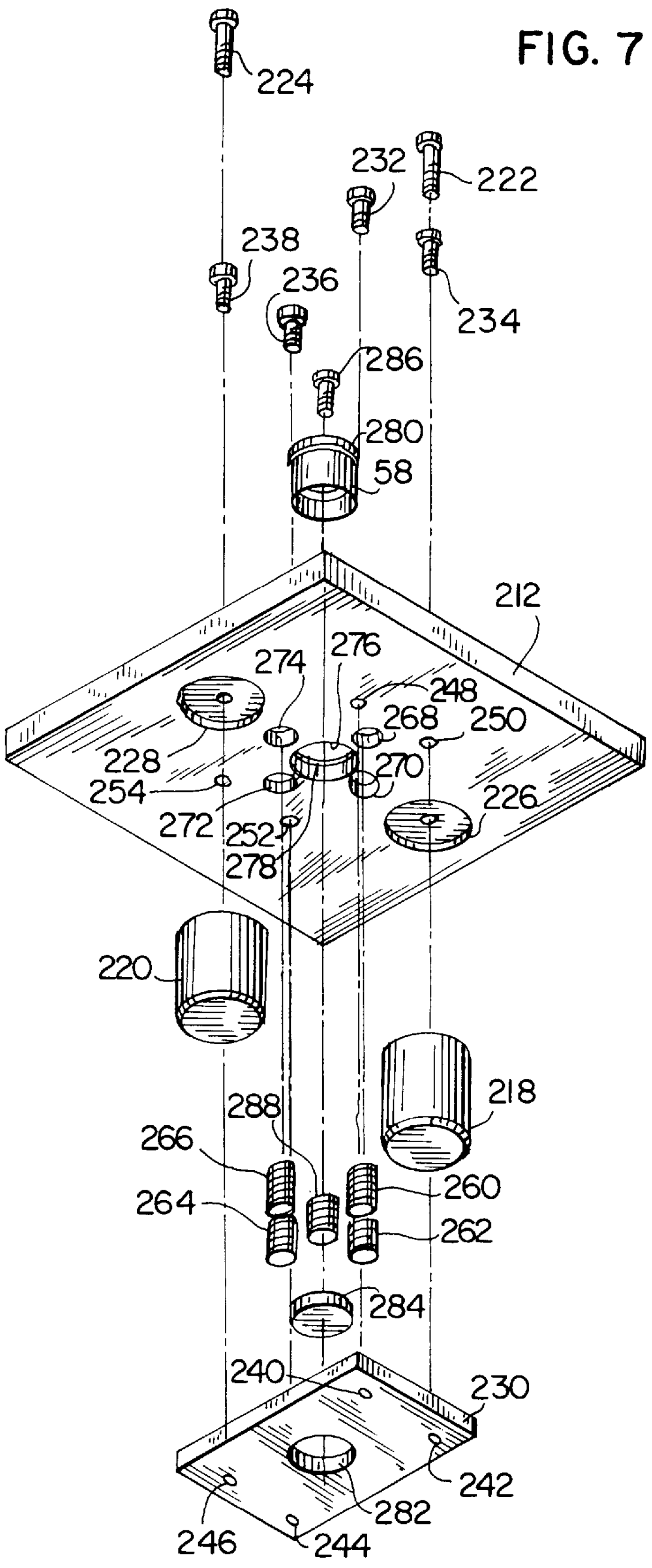
FIG. 7 is an exploded perspective view of a portion of the structure of FIG. 1.

An upper movable plate 212, FIG. 7, is driven axially downwardly by a ram 214 or the like, FIG. 4A, in turn driven by a hydraulically actuated plunger rod 216 or the like. A pair of rigid cylinders 218 and 220 are mounted to the underside of movable plate 212 by respective bolts 222 and 224 in respective pockets 226 and 228. The undersides of cylinders 218 and 220 are engageable with the top surfaces of respective cylinders 136 and 138, FIGS. 5A and 6A. A lost motion plate 230 is mounted in spaced relation below plate 212 by bolts 232, 234, 236, 238. The bolts are rigidly secured in threaded relation to plate 230 at respective threaded apertures 240, 242, 244, 246. The bolts loosely extend through respective apertures 248, 250, 252, 254 and have heads loosely received in enlarged upper portions of such openings, such as 256, 258, FIG. 3A. This enables plate 212 to continue downward movement even when downward movement of plate 230 is halted, to be described.

A plurality of helical springs 260, 262, 264, 266 are received in respective recesses 268, 270, 272, 274 on the underside of plate 212 and bear axially between plate 212 and plate 230. Plate 212 has a central opening 276 receiving upper punch 58. Opening 276 has an upwardly facing shoulder 278 receiving upper annular flange 280 of punch 58 to support the punch in opening 276. Punch 58 is a cylindrical tubular sleeve extending axially downwardly from flange 280 through opening 276 in plate 212 and opening 282 in plate 230. A central disc 284 is retained within the cylindrical interior of punch 58 by a bolt 286 extending downwardly from the top of punch 58 and threaded into disc 284. A helical spring 288 bears axially between disc 284 and the underside of the top end wall of punch 58 at 290, FIG. 4A.

Figure 3A:
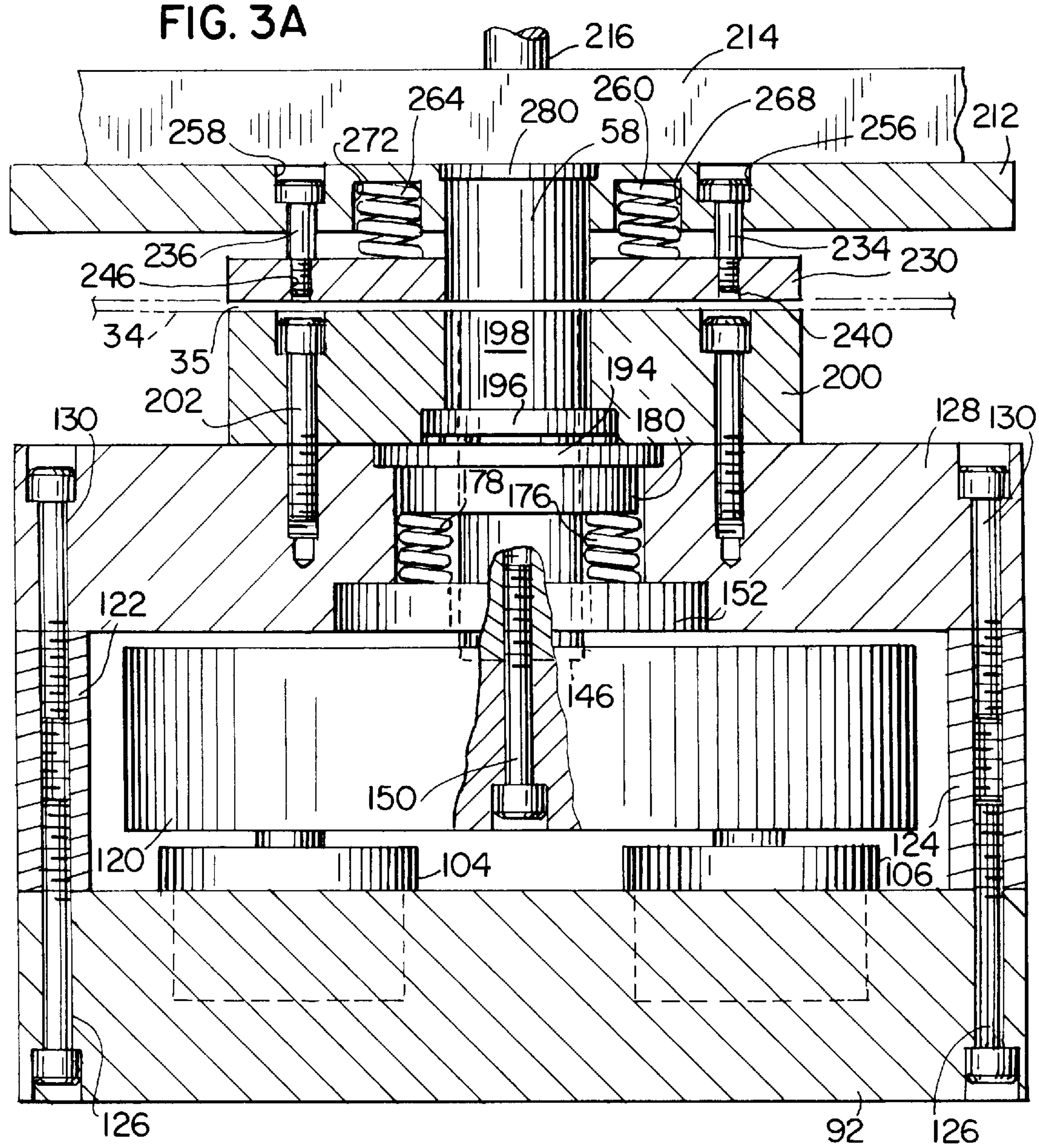
FIG. 3A is a sectional view taken along line 3A—3A of FIG. 2.
Figure 3B:
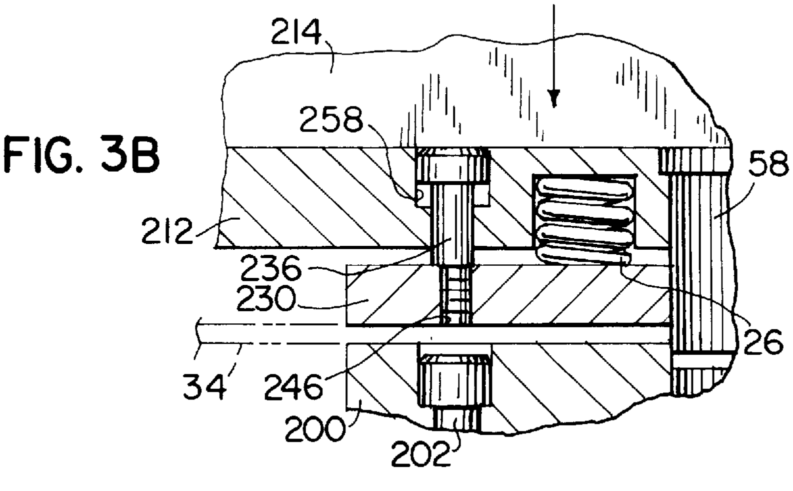
FIG. 3B is an enlargement of a portion of FIG. 3A.

In operation, strip 34, FIGS. 1, 3 and 4, is placed in axial gap 35, and upper plate 212 is moved downwardly. During this downward movement, plate 230, upper punch 58 and disc 284 engage the top surface of strip 34. The underside of strip 34 is engaged by the top surface of plate 200, sleeve 198 and punch 66, FIGS. 4A and 4B. During continued downward movement of plate 212, the bottoms of cylinders 218 and 220 engage the tops of cylinders 136 and 138, FIG. 5A. During the downward movement of plate 212 and cylinders 218 and 220 towards cylinders 136 and 138, plate 200 does not move because it is rigidly stopped against plate 128 which in turn is rigidly stopped against side rails 122 and 124, FIGS. 8B and 3A, which in turn are stopped against stationary base 92. During the noted downward movement of plate 212, lower inner punch 66 does not move because it is stopped against platform 120 which in turn is stopped against plungers 112, 114, 116, 118 which do not yet move because force sensors 104, 106, 108, 112 are calibrated to a greater threshold force than that applied by spring 288 bearing against disc 284, in one embodiment about 70 pounds. During the noted downward movement of ram 214 and plate 212, sleeve 198 does move downwardly, which motion is enabled by compression of springs 174, 176, 178. During this motion, the noted inner cut is performed by upper outer punch 58 at inner dimension 62, FIG. 9, and lower inner punch 66 at outer dimension 68, to provide reduced thickness portion 40, as above described. Also during this movement, the above noted first portion of the outer cut is performed, as shown at 292, FIG. 5B. Also during this movement, the pilot cuts are performed by fingers 72 and 74, FIG. 8A, providing the noted peel points at indention sections 50 and 52.

Upon continued downward movement of ram 214 and plate 212, after engagement of cylinders 218 and 220 with cylinders 136 and 138, there is a direct mechanical connection from ram 214 and plate 212 through cylinders 218, 220, 136, 138 to platform 120, and the force applied by ram 214 is greater than and overcomes the threshold force of sensors 104, 106, 108, 110, such that plungers 112, 114, 116, 118 move downwardly, permitting downward movement of platform 120 and hence downward movement of cylinders 136 and 138 and hence downward movement of cylinders 218 and 220 and hence downward movement of plate 212 as pushed downwardly by ram 214. During this continued downward movement, plate 200 remains stationary because it is stopped against plate 128 which in turn is stopped against rails 122 and 124 on base 92. Because plate 200 is stationary, plate 230 cannot move downwardly. The further downward movement of plate 212 relative to plate 230, and the shrinking axial gap therebetween, is enabled by compression of springs 260, 262, 264, 266 and the lost motion of bolts 232, 234, 236, 238 in plate 212 as enabled at openings such as 256, 258, FIGS. 3A and 3B, accommodating the heads of the bolts, as plate 212 moves downwardly relative to stationary bolts 232, 234, 236, 238. During this continued downward movement, upper punch 58 moves downwardly and completes the noted outer cut, as illustrated in FIGS. 6A and 6B at 294. During this portion of the motion, upper outer punch 58 and lower inner punch 66 move downwardly in unison to the position shown in FIGS. 6A and 6B. The punch button forming process is now completed. Ram 214 and upper plate 12 are raised, and piece 32 is removed from the die.

It is recognized that various equivalents, alternatives and modifications are possible within the scope of the appended claims. In the preferred embodiment, the inner cut along the inner periphery of ring 38 and the outer cut along the outer periphery of ring 38 are performed in a single die, as above described. In an alternate embodiment, the inner cut is performed in a first die, and the outer cut is performed in a second die. In each embodiment, it is preferred that the inner cut be performed first, and the outer cut second, though the sequence can be reversed.

We claim:

1. A method for forming a punch button comprising providing a strip of material of a first thickness from which said punch button is to be formed, performing an inner cut partially cutting through said strip to yield first and second subpieces joined to each other by said material of a second thickness less than said first thickness, performing an outer cut cutting all the way through said strip to yield a piece composed of said first and second subpieces, providing a die with an outer punch having a sidewall of given width between inner and outer dimensions, providing said die with an inner punch having an outer dimension less than said outer dimension of said outer punch and greater than said inner dimension of said outer punch, performing said inner cut at said outer dimension of said inner punch and said inner dimension of said outer punch, and performing said outer cut at said outer dimension of said outer punch.

2. The method according to claim 1 comprising disposing said punches in opposing aligned relation along an axial direction and facing each other across an axial gap therebetween, providing said strip as a planar sheet member, placing said strip between said punches in said axial gap such that the plane of said strip extends laterally of said axial direction, axially moving at least one of said punches to perform said inner and outer cuts.

3. The method according to claim 2 comprising moving only one of said punches to perform said inner cut.

4. The method according to claim 3 comprising moving both of said punches to perform said outer cut.

5. The method according to claim 2 comprising moving said outer punch to perform said inner cut and a portion of said outer cut.

6. The method according to claim 5 comprising moving both of said punches to complete said outer cut.

7. The method according to claim 1 comprising performing said inner and outer cuts in a single die.

8. The method according to claim 1 comprising performing said inner cut first, and performing said outer cut second.

9. A method for forming a punch button comprising providing a strip of material of a first thickness from which said punch button is to be formed, performing an inner cut partially cutting through said strip to yield first and second subpieces joined to each other by said material of a second thickness less than said first thickness, performing an outer cut cutting all the way through said strip to yield a piece composed of said first and second subpieces, performing both of said cuts in a singular die step operation comprising moving a first punch in one axial direction toward a second punch to perform said inner cut and a portion of said outer cut, and continuing movement of said first punch in said one direction and simultaneously moving said second punch in said one direction in unison with said first punch to complete said outer cut.

10. A method for forming a punch button comprising providing a strip of material of a first thickness from which said punch button is to be formed, performing an inner cut partially cutting through said strip to yield first and second subpieces joined to each other by said material of a second thickness less than said first thickness, performing an outer cut cutting all the way through said strip to yield a piece composed of said first and second subpieces, providing a die, performing a pilot cut with said die during performance of said inner cut and to a deeper depth than said inner cut.

11. The method according to claim 10 comprising performing said pilot cut along a designated portion of said inner cut.

12. The method according to claim 11 comprising separating said first and second subpieces from each other initially at said pilot cut along said designated portion of said inner cut and then along the remainder of said inner cut.

13. The method according to claim 11 comprising performing said pilot cut along distally opposite facing sections of said inner cut, separating said first and second subpieces initially at said distally opposite facing sections and then rotating said second subpiece relative to said first subpiece about a rotation axis perpendicular to an axis through said distally opposite facing sections.

14. The method according to claim 11 comprising performing said inner cut, said outer cut, and said pilot cut all in a singular continuous motion of a first punch along one axial direction motion in combination with motion of a second punch in said one axial direction in unison with said first punch during a portion of the travel motion of said first punch.

15. A method for forming a punch button having a central disc integral with and separable from an outer ring, comprising providing a strip of material of given thickness from which said punch button is to be formed, providing an inner punch defining the inner periphery of said ring, and an outer punch defining the outer periphery of said ring, performing an inner cut with said inner punch and cutting partially through said strip to yield first and second subpieces joined to each other by said material of a second thickness less than said first thickness, performing an outer cut with said outer punch and cutting all the way through said strip to yield a piece composed of said first and second subpieces providing said disc and said ring, respectively.

16. The method according to claim 15 comprising providing a die having said punches disposed in opposing aligned relation along an axial direction and facing each other across an axial gap therebetween, providing said strip as a planar sheet member, placing said strip between said punches in said axial gap such that said strip extends laterally of said axial direction, providing said outer punch with a sidewall of given lateral width between an outer surface at which said outer cut is performed and defining the outer periphery of said ring, and an inner surface defining the outer periphery of said disc, providing said inner punch with an outer surface defining the inner periphery of said ring, said outer surface of said inner punch being axially aligned with a point laterally between said outer and inner surfaces of said sidewall of said outer punch.

17. The method according to claim 16 wherein said outer punch has an end wall extending laterally between said inner and outer surfaces and facing axially across said gap, and said inner punch has a laterally extending end wall facing axially across said gap and having an outer peripheral end wall portion axially aligned with a portion of said end wall of said outer punch, and comprising effecting relative axial movement of said punches toward each other to engage and compress said strip between said aligned axial end wall portions of said outer and inner punches and push material in said strip laterally inwardly to said disc and laterally outwardly to said ring to yield remaining material of said second thickness axially between said aligned end wall portions of said outer and inner punches and laterally between said disc and said ring.

18. The method according to claim 17 wherein following said inner and outer cuts, said disc has a lower portion laterally aligned with an upper portion of said ring, and said disc has an upper portion axially offset from a lower portion of said ring.

19. The method according to claim 18 comprising providing said inner punch with at least one outer peripheral finger extending axially away from said end wall of said inner punch, and comprising performing a pilot cut with said finger during performance of said inner cut and to a deeper depth than said inner cut.

20. The method according to claim 19 wherein said finger is axially aligned with the inner periphery of said ring and laterally spaced outwardly of the outer periphery of said disc.

21. The method according to claim 15 wherein said disc is circular, and said ring is an annulus.

22. The method according to claim 15 comprising performing said inner and outer cuts in a single die.

23. The method according to claim 15 comprising performing said inner cut first, and performing said outer cut second.

* * * * *